(No Model.)
E. L. EVENS.
VELOCIPEDE.
No. 573,456. Patented Dec. 22, 1896.
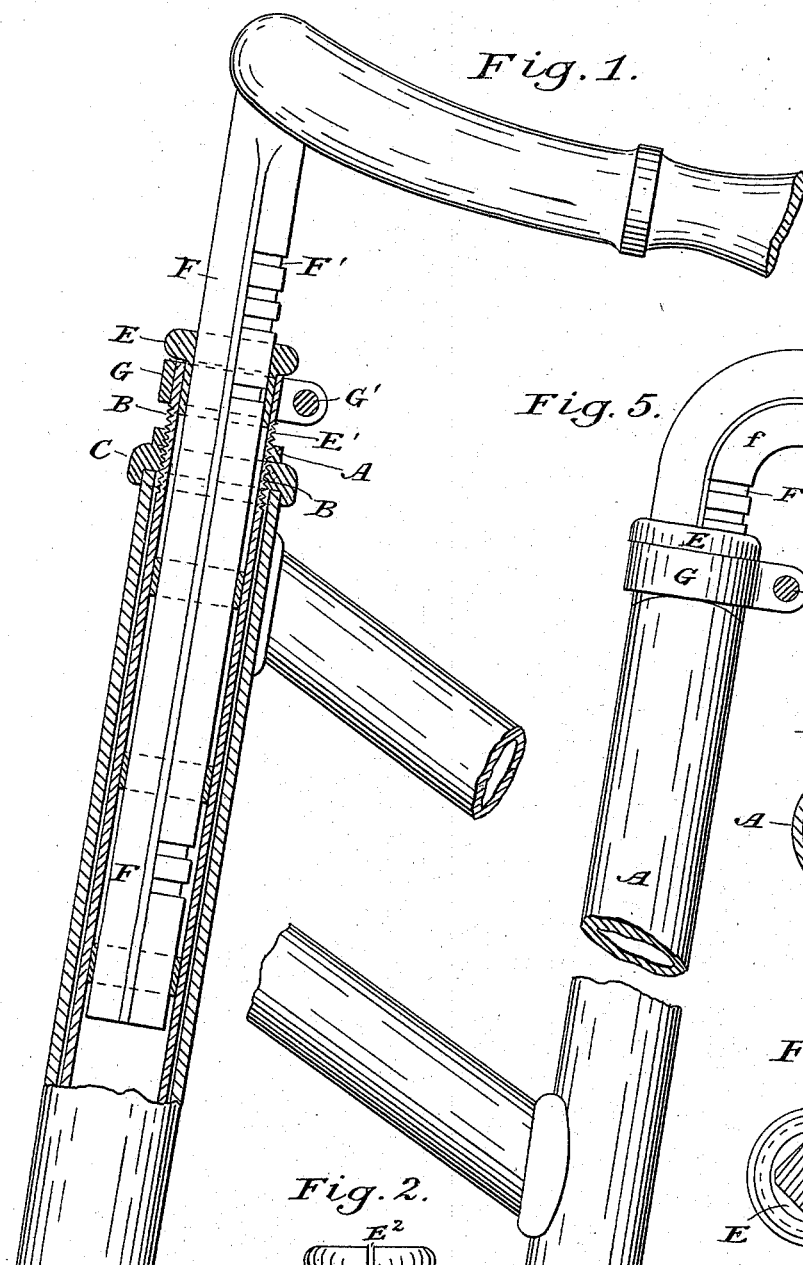
WITNESSES:
E. B. Bolton
E. A. Scott
INVENTOR
Edward Luscombe Evens
BY Richard R.
ATTORNEYS
THE NORRIS PETERS CO., PHOTO-LITHO., WASHINGTON, D. C.

UNITED STATES PATENT OFFICE.

EDWARD LUSCOMBE EVENS, OF MALVERN, SOUTH AUSTRALIA.

VELOCIPEDE.

SPECIFICATION forming part of Letters Patent No. 573,456, dated December 22, 1896.

Application filed April 2, 1896. Serial No. 585,947. (No model.)

*To all whom it may concern:*

Be it known that I, EDWARD LUSCOMBE EVENS, of Malvern, near Adelaide, in the Province of South Australia, have invented Improvements in Velocipedes, of which the following is a specification.

My invention relates to certain improvements in velocipedes, especially to those of the "Rover" or "Safety" bicycle type.

In my invention I use for the steering-standard either square, hexagonal, or other convenient section having sides and corners thereon, and I provide a collar or socket having a square, hexagonal, or other corresponding hole therein of sufficiently large dimensions to allow the standard to be moved vertically, but at the same time so as to avoid any horizontal movement of the same due to twisting or revolving. The socket is a fixture in the frame-tube. The appliance is also applicable to the saddle-rest. The usual telescopic movement of the standard for adjusting the height of the handle-bar is governed by means of indentations or grooves in the standard, which are engaged by corresponding projections in the socket, and in addition to the grooves and projections a set-screw or a spring-clip may be added to the device, if so desired.

In order that my invention may be the better understood, I will further describe the same in detail, having reference to the accompanying illustrative drawings, in which—

Figure 1 is a sectional elevation of front part of bicycle. Fig. 2 illustrates section of inner tube, showing slotted socket; Fig. 3, section through tubes, socket, and standard; Fig. 4, plan of socket, showing standard in section, also strap-and-bolt device; Fig. 5, saddle carrier and rest arranged on same principle.

Similar letters of reference are used to denote like parts throughout the drawings.

A is the outer casing of the bicycle, through which the tube B passes, being held in place by the nut C in the ordinary way.

E is the handle-bar socket, through which the handle-bar standard F is passed. $f$ is the saddle-rest. The said handle-bar standard and saddle-rest are indented or grooved at F'', and projections corresponding with the said grooves or indentations are formed upon the inner edge of the socket, as shown at E'. The socket E is grooved or cut at $E^2$, Fig. 2, and is made a fixture in any convenient manner with the tube B, which is likewise cut or grooved. An ordinary metal strap G and bolt G' are arranged as shown for closing the slot on the socket and tube.

When the handle-bar standard F or saddle-rest $f$ has been adjusted by elevation or depression to the required height, the bolt G' of the strap G is tightened up so as to close the slot in the tube B and also in the socket E, thus causing the socket to grip the standard F or rest $f$ and to hold it firmly in the required position.

The control of vertical movement will be greatly increased by the use of the projections and grooves E' F', hereinbefore described, when the former are caused to engage the latter by the action of the strap-and-bolt device.

It will readily be seen that if the sockets are set properly in the construction of the machine the handle-bar can readily be placed exactly at right angles to the front wheel and the saddle-rest can be placed in line with the framework.

It will also be seen that by employing the device hereinbefore described the guiding control of the machine is retained even though the grip of the strap be weakened.

Having now particularly described and ascertained the nature of my said invention and in what manner the same is to be performed, I declare that what I claim is—

In combination with the steering-head B, a socket E at the top thereof having a rectangular bore and the projection therein, and the steering-spindle F having a rectangular cross-section to fit the socket and grooves extending about it at different heights, said socket E and steering-head being split and the clamp surrounding the said parts to fix the socket E in place and to clamp the same upon the steering-rod, substantially as described.

In witness whereof I have hereunto set my hand in presence of two witnesses.

EDWARD LUSCOMBE EVENS.

Witnesses:
PERCY JOHN CLARK,
JOHN HERBERT COOKE.